United States Patent
Ross

(10) Patent No.: US 12,401,671 B1
(45) Date of Patent: Aug. 26, 2025

(54) MANAGING ANALYTIC RESULTS IN A CYBERSECURITY SYSTEM

(71) Applicant: Splunk Inc., San Francisco, CA (US)

(72) Inventor: Alan D. Ross, Hingham, MA (US)

(73) Assignee: Cisco Technology, Inc., San Jose, CA (US)

( * ) Notice: Subject to any disclaimer, the term of this patent is extended or adjusted under 35 U.S.C. 154(b) by 186 days.

(21) Appl. No.: 18/159,484

(22) Filed: Jan. 25, 2023

(51) Int. Cl.
*H04L 9/40* (2022.01)

(52) U.S. Cl.
CPC ...... *H04L 63/1425* (2013.01); *H04L 63/1416* (2013.01); *H04L 63/1441* (2013.01)

(58) Field of Classification Search
CPC ............. H04L 63/1416; H04L 63/1425; H04L 63/1441
USPC ............................................... 726/13, 22–23
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 10,158,653 B1* | 12/2018 | Magcale | H04L 63/1441 |
| 11,150,976 B1* | 10/2021 | Marwah | G06F 11/0793 |
| 2013/0326620 A1* | 12/2013 | Merza | H04L 63/1416 726/22 |
| 2019/0098106 A1 | 3/2019 | Mungel et al. | |
| 2020/0382547 A1* | 12/2020 | Basballe Sorensen | H04L 63/1433 |
| 2021/0026961 A1* | 1/2021 | Underwood | G06F 21/566 |
| 2021/0329089 A1* | 10/2021 | Yellin | H04L 67/5681 |
| 2022/0086179 A1* | 3/2022 | Levin | H04W 12/63 |
| 2022/0201010 A1* | 6/2022 | Tarsauliya | G06F 21/44 |
| 2022/0224711 A1* | 7/2022 | Singh | G06F 21/552 |
| 2023/0068946 A1* | 3/2023 | McCarthy | G06F 21/554 |
| 2023/0262077 A1* | 8/2023 | Palmer | H04L 63/0245 726/13 |
| 2024/0080344 A1* | 3/2024 | Francesco | H04L 63/1416 |

OTHER PUBLICATIONS

Splunk Enterprise 8.0.0 Overview, available online, retrieved May 20, 2020 from docs.splunk.com.

(Continued)

*Primary Examiner* — Lizbeth Torres-Diaz

(57) ABSTRACT

In a computer-implemented method for managing analytic results in a cybersecurity system, data representing a plurality of events are accessed, where the plurality of events include machine data generated by entities that are part of or that interact with a computer network. A cybersecurity analytic of a cybersecurity application is applied to the data to produce analytic results, wherein the cybersecurity analytic is to detect a cybersecurity-related anomaly or threat. A performance of the cybersecurity analytic is then evaluated by applying the analytic results to a specified performance criterion. A corrective action for the cybersecurity analytic is then determined, based on a result of evaluating the performance of the cybersecurity analytic. Zero or more anomaly or threat detections by the cybersecurity analytic are then incorporated into an output of the cybersecurity application, based on the determined corrective action.

20 Claims, 10 Drawing Sheets

(56) References Cited

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

\* cited by examiner

500

```
┌─────────────────────────────────────────────────────────────────┐
│  Access data representing a plurality of events, the plurality  │
│  of events including machine data generated by a plurality of   │
│  entities that are part of or that interact with a computer     │
│  network                                                         │
│                              501                                 │
└─────────────────────────────────────────────────────────────────┘
                                │
                                ▼
┌─────────────────────────────────────────────────────────────────┐
│  Apply a cybersecurity analytic of a cybersecurity application  │
│  to the data to produce a plurality of analytic results,         │
│  wherein the cybersecurity analytic is to detect a               │
│  cybersecurity-related anomaly or threat                         │
│                              502                                 │
└─────────────────────────────────────────────────────────────────┘
                                │
                                ▼
┌─────────────────────────────────────────────────────────────────┐
│  Evaluate a performance of the cybersecurity analytic by        │
│  applying the plurality of analytic results to a specified      │
│  performance criterion                                           │
│                              503                                 │
└─────────────────────────────────────────────────────────────────┘
                                │
                                ▼
┌─────────────────────────────────────────────────────────────────┐
│  Determine a corrective action for the cybersecurity analytic,  │
│  based on a result of evaluating the performance of the          │
│  cybersecurity analytic                                          │
│                              504                                 │
└─────────────────────────────────────────────────────────────────┘
                                │
                                ▼
┌─────────────────────────────────────────────────────────────────┐
│  Incorporate zero or more anomaly or threat detections by the   │
│  cybersecurity analytic into an output of the cybersecurity     │
│  application, based on the determined corrective action,         │
│  wherein the output is to be sent to an external user computer   │
│  system                                                          │
│                              505                                 │
└─────────────────────────────────────────────────────────────────┘
                                │
                                ▼
┌─────────────────────────────────────────────────────────────────┐
│  Provide the output of the cybersecurity application to the     │
│  external user computer system                                   │
│                              506                                 │
└─────────────────────────────────────────────────────────────────┘
```

FIG. 5

MANAGING ANALYTIC RESULTS IN A CYBERSECURITY SYSTEM

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 5 shows another example of a process for managing outcomes of cybersecurity analytics so as to reduce false positives and noise.

DETAILED DESCRIPTION

Figure 1:
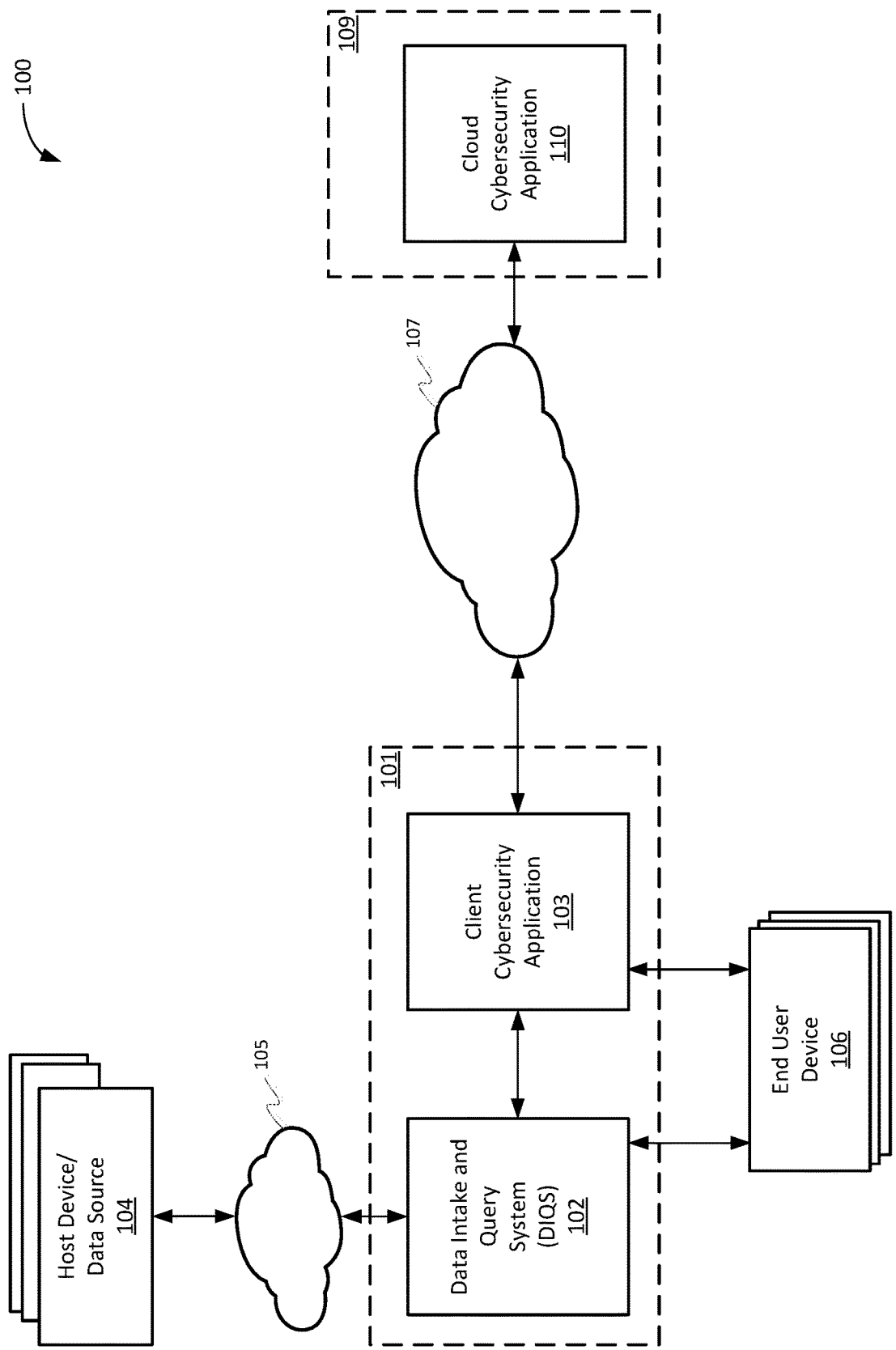
FIG. 1 shows an example of a data processing environment 100 including a data intake and query system (DIQS) and a cybersecurity application.

Software tools exist to enable or facilitate the storage, indexing and searching of massive quantities of data. Cybersecurity, including but not limited to computer network security, is one of many applications of such tools. For example, a software tool in the form of a data intake and query system (DIQS) may ingest, index and store machine generated data from various sources on a computer network. Such a system may be used in conjunction with a cybersecurity application that applies various rules and/or algorithms to identify actual or potential security-related anomalies and threats from the ingested network data ingested by the DIQS. The cybersecurity application may provide a graphical user interface (GUI) that enables a cybersecurity analyst to monitor the status of the network and to define and view results of cybersecurity related searches of the ingested data.

In some instances, cybersecurity functionality may be distributed between an on-premises application and a cloud-based application, or between an on-premises component and a cloud-based component of a particular cybersecurity application. For example, many business enterprises may each operate their own on-premises DIQS and/or cybersecurity application as a user environment; yet they may each wish to have their respective data analyzed by at least some of the same cybersecurity analytic algorithms (hereinafter simply "analytics") from a particular cybersecurity software provider. At least some of those analytics may reside and execute in a cloud-based system of the cybersecurity software provider. The cloud-based system may ingest large volumes of data from each business enterprises' on-premises DIQS, run the cybersecurity analytics on that data in the cloud to detect anomalies and/or threats, and send results of the cybersecurity analytics to the enterprises' respective DIQS's or on-premises cybersecurity applications.

While a cloud-based implementation such as this provides certain efficiencies, it also presents certain challenges. A number of independent variables can impact cybersecurity related analytics. Information technology (IT) environment changes, process changes, software code changes, legal and regulatory changes, and many other things happen frequently if not every day. With the cloud-based system ingesting data from potentially thousands of user environments, it can be very difficult for the cybersecurity software provider to keep up with all of the changes, which can lead to cybersecurity analytics creating many false positives and noise. It would be undesirable to send such spurious results to the user environments, where they can induce improper actions by end users (e.g., network security analysts), or at least burden end users with having to sort through the data to determine which data is reliable and which is not.

Introduced here, therefore, is a computer-implemented technique for managing analytic results, particularly though not necessarily in a cybersecurity system, in a way that reduces false positives and noise in the outputs of the analytics. Note that while the technique is described herein in the context of cybersecurity analytics, it is also applicable to essentially any type of "big data" analytic system with independent variables.

In at least one embodiment, the technique introduced here includes a cloud-based cybersecurity application initially receiving, via a network, data representing various events from multiple on-premises end-user computer systems. The events include machine data generated by entities that are part of or that interact with computer networks associated with the end-user computer systems. The cloud-based cybersecurity application applies various cybersecurity analytics to the received data, to produce analytic results, where each analytic is to detect a different type of cybersecurity-related anomaly or threat. The cybersecurity application then evaluates the performance of each of the cybersecurity analytics, by applying the outputs (results) of each analytic to a specified performance criterion. The evaluation can be performed by a machine learning runtime, for example. The performance criterion may be different for each analytic and may be, for example, a threshold number of positive anomaly or threat detections (also called "firings") during a specified time interval (e.g., more than 100 firings in an hour). In some embodiments, the performance criterion may be based on a random sampling of anomaly or threat detections by the analytic. Other types of performance criteria may be used, as discussed further below. The performance criteria used to evaluate the analytics may be stored in the form of one or more policies or rules.

For any analytic that fails to satisfy of performance criterion (e.g., that exceeds the threshold number of firings per unit time), the cybersecurity application then determines and applies a corrective action for the cybersecurity analytic. For any given analytic, the corrective action may include, for example, throttling down the analytic, i.e., reducing the number or fraction of firings by the analytic that are provided to the end-user computer system or are that are included in a result sent to the end-user computer system. In some instances, the corrective action may include completely disabling an analytic, e.g., if the results of the analytic appear to be so far beyond normal/expected range as to make all results of the analytic unreliable or suspect. In effect, therefore, this technique can operate as a "circuit breaker" on the analytics outputs of the cybersecurity application.

Additionally or alternatively, in some embodiments a low firings threshold or other criterion can be applied to identify and correct for underperforming analytics. For example, if an analytic fires (detects an anomaly or threat) fewer than some specified number of times within a specified time interval, it may be deemed ineffective ("underfiring"), and therefore may be taken off-line.

In some embodiments, one or more of the analytics may be implemented using machine learning algorithms and associated models. Other machine learning algorithms and associated models may be used to evaluate the performance of the analytics, to determine corrective actions based on evaluations of the analytics' performance, to determine the performance criteria (e.g., thresholds), or any combination of these functions. In some embodiments, the results of a particular analytic operating on data from different end-user computer systems may be aggregated and evaluated collectively to determine normal or expected behavior of the analytic, in order to appropriately set the performance criteria for that analytic. Further, in some embodiments, the outputs of multiple analytics of different types may be aggregated and evaluated collectively to determine normal or expected behavior, in order to appropriately set the performance criteria for one or more of those analytics. Other details of the technique introduced here will become apparent from the description that follows.

FIG. 1 shows an example of a data processing environment 100, in which the technique introduced here can be implemented. In the illustrated embodiment, the environment 100 includes an end-user computer system 101, one or more host devices 104 and one or more end-user devices (also called "client devices" or simply "clients") 106, all coupled to each other by a network 105. The end-user computer system 101 includes a DIQS 102 and a client-side cybersecurity application 103.

The DIQS 102 can ingest, index, and/or store data from heterogeneous data sources and/or host devices 104. For example, the DIQS 102 can ingest, index, and/or store any type of machine data, regardless of the form of the machine data or whether the machine data matches or is similar to other machine data ingested, indexed, and/or stored by the DIQS 102. In some cases, the DIQS 102 can parse the received data into events, group the events, and store the events in buckets. An "event" in this context is a portion of machine data associated with a specific point in time (e.g., by a timestamp). The DIQS 102 can also search heterogeneous data that it has stored or search data stored by other systems (e.g., other DIQS systems or other non-DIQS systems). For example, in response to received queries, the DIQS 102 can assign one or more components to search events stored in the storage system or search data stored elsewhere. An example of a commercially available data intake and query system that can be used to implement the DIQS 102 is SPLUNK® ENTERPRISE, developed by Splunk Inc. of San Francisco, California.

As described in greater detail below, the DIQS 102 can include one or more components (not shown in FIG. 1) to ingest, index, store, and/or search data. In some embodiments, the DIQS 102 is implemented as a distributed system that uses multiple components to perform its various functions. For example, the DIQS 102 can include any one or any combination of an intake system (including one or more components) to ingest data, an indexing system (including one or more components) to index the data, a storage system (including one or more components) to store the data, and/or a query system (including one or more components) to search the data, etc.

The client-side cybersecurity application 103 can be a software application that runs logically "on top of" or in cooperation with the DIQS 102. An example of such a network cybersecurity application is SPLUNK® ENTERPRISE SECURITY, also developed by Splunk Inc. In at least some embodiments, the client-side cybersecurity application 103 may include a user interface generator to generate a graphical user interface (GUI), a risk scoring engine to generate risk scores for entities and/or events, and a search engine to enable an end user to search data acquired and indexed by the DIQS 102. In at least some embodiments, client devices 106 of the DIQS 102 also are clients of (and therefore have access to) the client-side cybersecurity application 103.

The environment 100 also includes a cloud-based (server-side) computer system 109, which includes a cloud-based cybersecurity application 110. In some embodiments, the client-side cybersecurity application 103 and the cloud-based cybersecurity application 110 are components of the same distributed application. In other embodiments, the client-side cybersecurity application 103 and the cloud-based cybersecurity application 110 are separate applications. The cloud-based cybersecurity application 110 may receive event data from the end-user computer system 101 via the network 107. Such data may be provided directly by the DIQS 102, or it may be provided from the DIQS 102 to the cloud-based cybersecurity application 110 via the client-side cybersecurity application 103, which may preprocess some of the data.

The cloud-based cybersecurity application 110 may include various cybersecurity analytics, which it applies to the event data received from the end-user computer system 101, to evaluate risk levels associated with the event data received from the end-user computer system 101. Additionally, cloud-based computer system 109 and cloud-based cybersecurity application 110 may receive event data from multiple end-user computer systems like end-user computer system 101. Accordingly, the cloud-based cybersecurity application 110 is equipped with features to manage analytics and reduce the number of false firings and noise in their outputs, according to the technique introduced here, as described above and as now further described in reference to FIG. 2.

Figure 2:
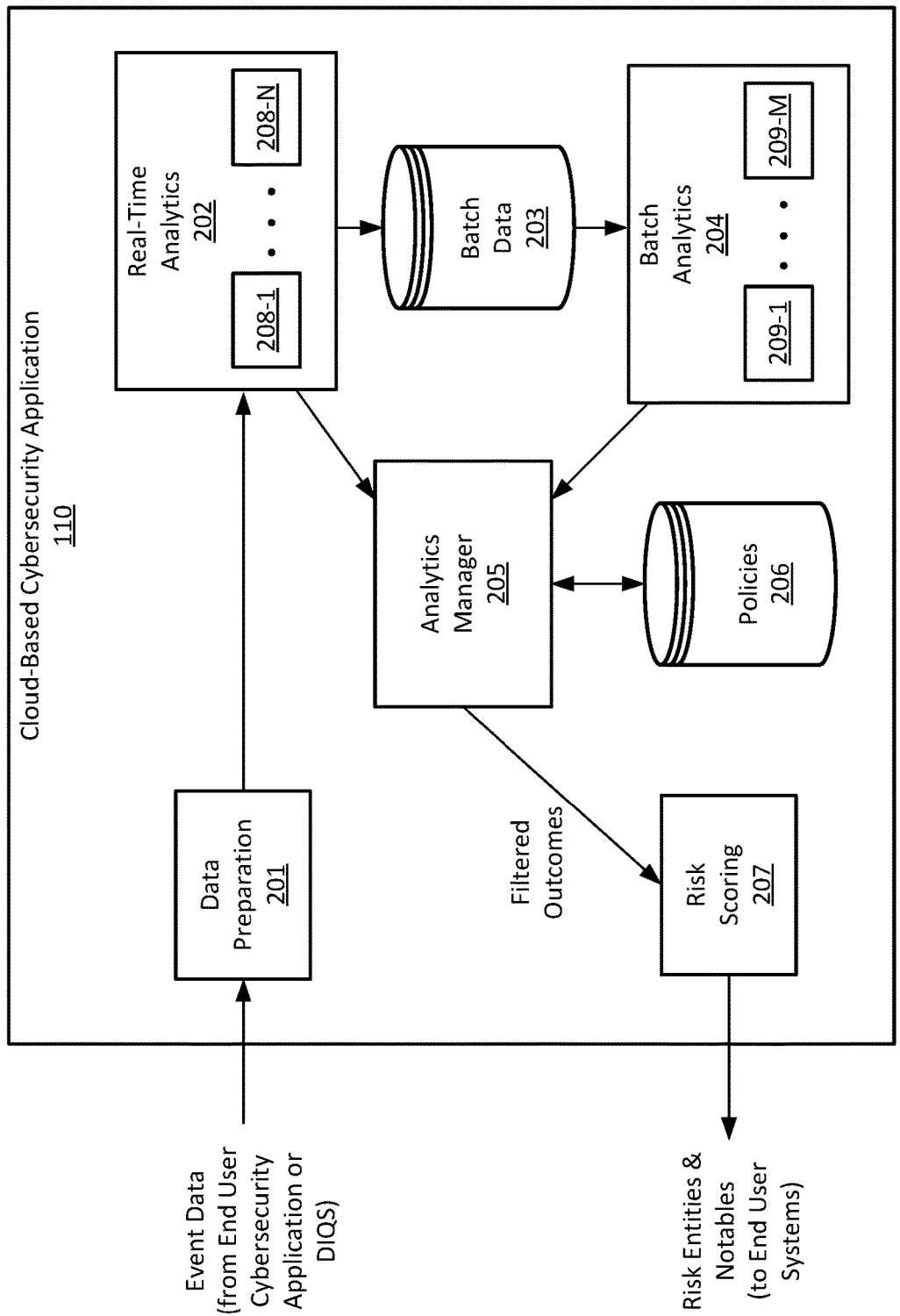
FIG. 2 illustrates an example of the elements of the cloud-based cybersecurity application.

FIG. 2 illustrates an example of the elements of the cloud-based cybersecurity application 110, according to at least one embodiment. As shown, the cloud-based cybersecurity application 110 includes a data preparation module 201, a real-time analytics module 202, a data repository 203, a batch analytics module 204, an analytics manager 205, a policies database 206, and a risk scoring module 207. The data preparation module 201 receives event data from multiple end-user computer systems, such as end-user computer system 101 in FIG. 1, and applies various types of preprocessing to that data to facilitate risk analysis and scoring. For example, the data preparation module 201 may perform any one or more of: deduplication, data cleaning, transformation of the received data into a common model/schema, etc. The real-time analytics module 202 includes a number (N) of (i.e., one or more) cybersecurity analytics 208-1 through 208-N(hereinafter collectively called "analytics 208") for detecting cybersecurity anomalies and threats in a real-time (online) mode. At least some of these analytics 208 may be implemented in the form of one or more machine learning algorithms and associated models. The real-time analytics module 202 receives the processed event data from the data preparation module 201 and executes the real-time analytics 208 against that event data. The analytics 208 included in the real-time analytics module 202 are generally executed in real time, on an ongoing basis, as the data is received by the cloud-based cybersecurity application 110. Positive anomaly and/or threat detections ("firings") output by the real-time analytics 208 are provided in real time to the analytics manager 205, and are also stored in the data repository 203, which also stores the preprocessed event data from the data preparation module 201. The data repository 203 can be any form of persistent data store suitable for storing large volumes of data.

The batch analytics module 204 also includes a number (M) of (i.e., one or more) cybersecurity analytics 209-1 through 209-M (hereinafter collectively called "analytics 209") for detecting cybersecurity anomalies and threats in a batch (offline) mode. At least some of these analytics 209 may be implemented in the form of one or more machine learning algorithms and associated models. The batch analytics module 204 executes its analytics 209 on preprocessed event data stored in the data repository 203. By doing so, the batch analytics module 204 provides the benefit of being able to detect anomalies and threats based on a larger set of data than that upon which the real-time analytics module 202 operates. At least some of the batch analytics 209 may be the same as some of the real-time analytics 208, although the batch analytics 209 may also include other analytics that are not included among the real-time analytics 208, e.g., analytics 209 that are more suitable for operating on batch data. Similarly, the real-time analytics 208 may contain certain analytics that are not included among the batch analytics 209, which are more suitable for operation on real-time data.

Anomaly or threat detections by the real-time analytics 208 or batch analytics 209 that are deemed reliable (or that are not deemed unreliable) by the analytics manager 205 are allowed to pass through to the risk scoring module 207, as described further below. The risk scoring module 207 identifies risk notables (incidents) from anomaly and threat detections that it receives from the analytics manager 205, associates them with corresponding events and network entities, and assigns risk scores to the risk notables and the associated entities. The risk scoring module 207 then passes the associated events, notables, entities and risk scores back to the appropriate end-user computer system, where the client-side cybersecurity application (e.g. cybersecurity application 103) can make them available to an end user for search and/or further analysis. The risk scoring module 207 may identify risk notables and assigns risk scores by using any of various techniques, such as, for example, rules, machine learning, or a combination thereof. The risk scoring module 207 can operate in both real-time mode (i.e., based on outputs of the real-time analytics module) and in batch mode (i.e., based on outputs of the batch analytics module). The network entities identified by the risk scoring module 207 can include, for example, computer users, devices (e.g., clients, servers, routers, virtual machines), applications, or a combination thereof.

Positive anomaly and threat detections (also called "results" or "outputs") generated by the analytics in the real-time analytics module 202 and the batch analytics module 204 are provided to or accessed by the analytics manager 205, according to a specified timing interval or schedule. The analytics manager 205 incorporates techniques for reducing false positives and noise in those outputs, in accordance with the technique introduced here. The analytics manager 205 acts (figuratively) as a circuit breaker, or filter, on the positive anomaly and threat detections by the analytics 208 and 209. The analytics manager 205 does this in accordance with policies stored in the policies database 206, which may include, for example, criteria for evaluating the outputs of analytics, such as overfiring thresholds, under firing thresholds, etc. Some evaluation criteria may be customized for particular analytics, while other evaluation criteria may be generally applied to some or all of the analytics. Additionally, policies stored in the policies database 206 may be created and/or edited by the analytics manager 205 based on results of its evaluation of the performance of the various analytics. The analytics manager 205 may contain one or more machine learning algorithms and associated models for evaluating the performance of analytics 208 and 209 and/or for taking corrective action based on evaluation of analytics' performance, and/or for creating or editing policies for evaluation of analytics 208 and 209.

Figure 3:
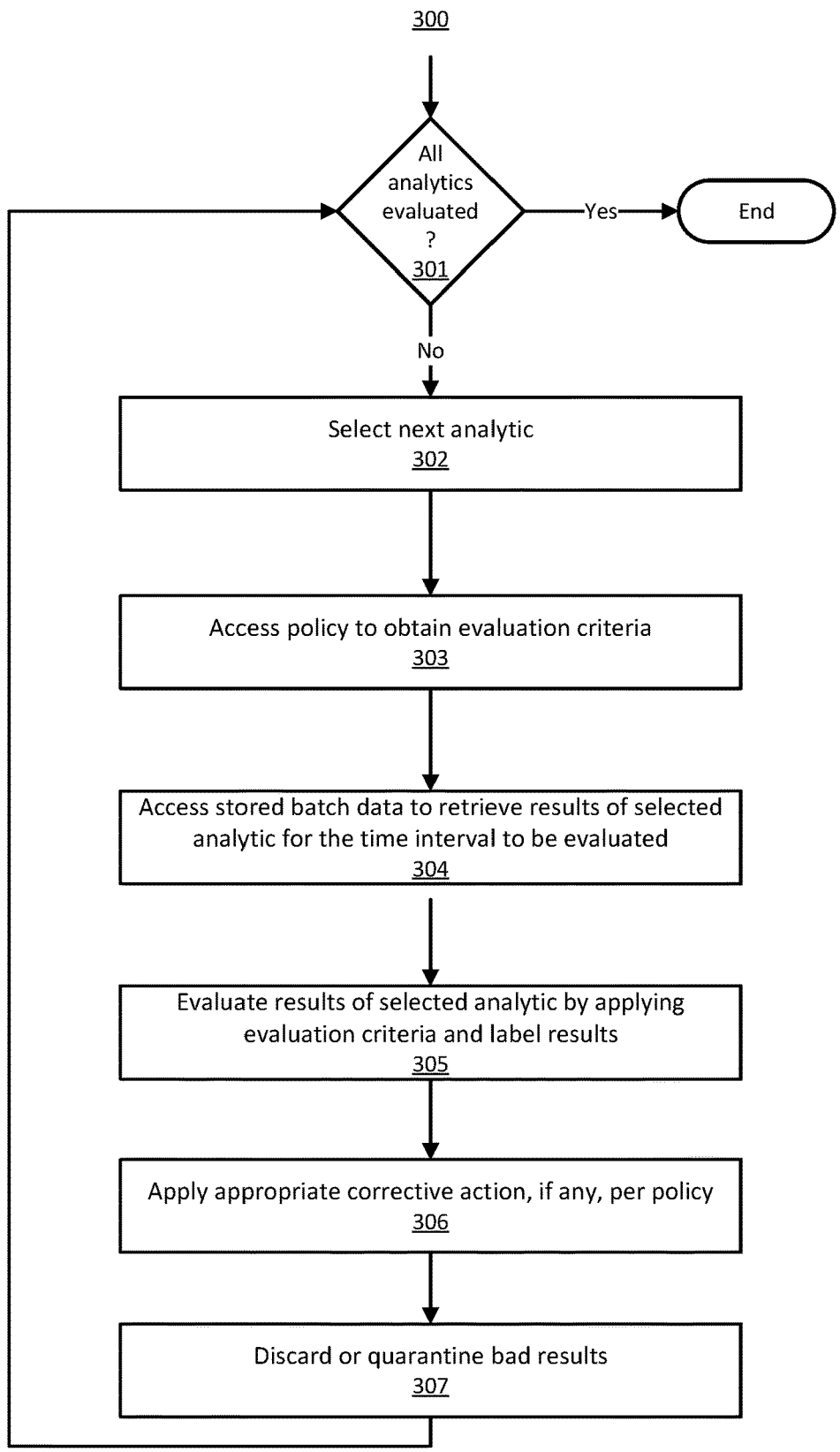
FIG. 3 illustrates an example of a process that may be performed by the analytics manager.

FIG. 3 illustrates an example of a process that may be performed by the analytics manager 205. The process 300 may be performed periodically according to a specified time interval (e.g., daily), at specified days/times, or based on any other suitable or convenient time criterion or trigger. Initially, at step 301 the process 300 checks to determine whether all of the analytics, from the set of analytics that are to be evaluated, have been evaluated during the current run of the process. The process 300 can be run on each of the real-time analytics 208 and each of the batch analytics 209, or for any selected one or more of those analytics. However, for both types of analytics, i.e., real-time and batch, in at least some embodiments the process 300 evaluates only the analytics' outputs stored in the data repository 203, not outputs directly from a real-time stream, since a real-time data stream may not provide a sufficient amount of analytic output data with which to evaluate an analytics' performance.

If, at step 301, not all of the analytics to be evaluated have been evaluated during the current run of the process 300, then the process proceeds to step 302, in which it selects the next analytic to be evaluated. The process 300 then accesses the policy database 206 at step 303 to obtain the correct policy for the selected analytic, including the evaluation criteria. Next, at step 304 the process 300 accesses the data repository to retrieve the results (positive anomaly or threat detections) of the selected analytic (which can be a real-time analytic or a batch analytic) for the time interval to be evaluated. The time interval to be evaluated may also be specified in the policy, and may be different for different analytics. At step 305 the process 300 evaluates the retrieved results (i.e., positive anomaly or threat detections) of the selected analytic by applying the evaluation criteria. The evaluation criteria can include one or more thresholds, for example, as further described below. Additionally, at step 305 the process 300 labels the evaluated results of the analytics and/or the analytic itself, according to the result of the evaluation. For example, individual detections or groups of detections may be labeled as "false positive" or "correct." These labels may then be used to train further the machine learning algorithms (if any) that are used by step 305 to evaluate analytics. Additionally, an individual analytic may be labeled as "overfiring" or "under firing," for example. At step 306, the process 300 applies an appropriate corrective action, if any such action is needed, according to the policy for the selected analytic, or according to a default or generally applicable policy. For example, the process 300 may "throttle down" an overfiring analytic by filtering out a portion (e.g., a specified percentage) of its positive detections, to prevent them from reaching the risk scoring module 207. Alternatively, if a particular analytic is grossly overfiring, it may be completely disabled. At step 307, the process 300 discards or quarantines any bad results (i.e., false positives) of the selected analytic that were identified in step 305. The process 300 then loops back to step 301, described above.

Figure 4:
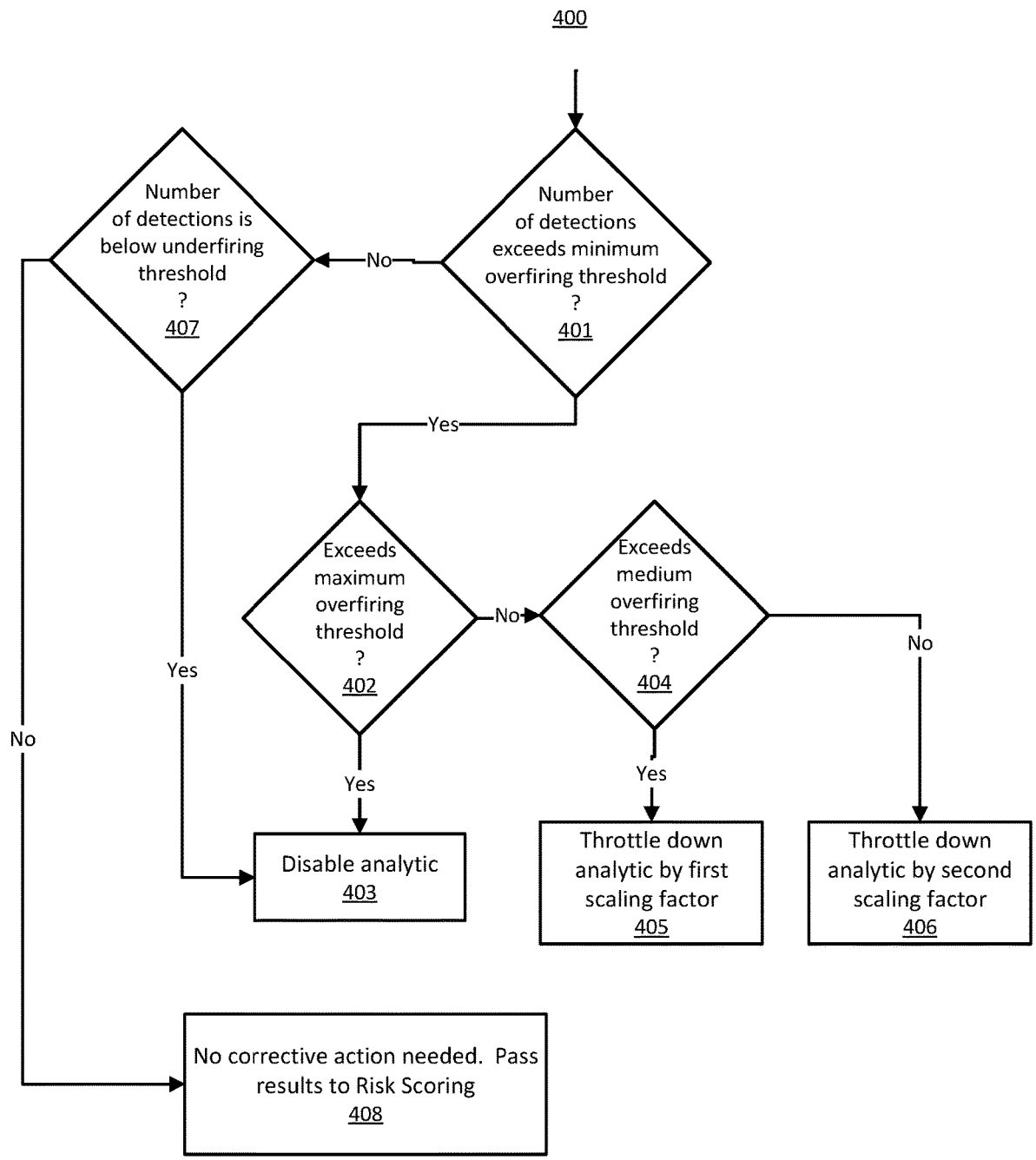
FIG. 4 illustrates a process representing an example of evaluating retrieved results of an analytic.

FIG. 4 illustrates a process 400 representing an example of step 305 in greater detail. Note that, as with process 300 and all other techniques disclosed herein, many variations upon process 400 are possible. The process 400 determines at step 401 whether the selected analytic is overfiring, by determining whether the number of positive detections by the selected analytic within the specified time interval is greater than a minimum overfiring threshold. If the outcome of step 401 is yes, then the process 400 determines at step 402 whether the number of positive detections by the selected analytic during the specified time interval is greater than a maximum overfiring threshold. If the outcome of step 402 is yes, then that means the selected analytic is grossly overfiring, in which case the selected analytic is then disabled at step 403. If the outcome of step 402 is no, then the process 400 determines at step 404 whether the number of positive detections by the selected analytic in the specified time interval is greater than a medium overfiring threshold. If the outcome of step 404 is yes, that means the selected analytic is moderately overfiring, so the process 400 throttles down the selected analytic by a specified first scaling factor in step 405. Step 405 may involve filtering out a portion of the outputs of the selected analytic (including but not limited to the outputs that were just analyzed), so that they do not get passed to the risk scoring module 207. For example, step 405 may involve filtering out 50% of all positive detections by the selected analytic, at least until the next time process 300 is executed on that analytic. If the outcome of step 404 is no, that means the selected analytic is only minimally overfiring, in which case in step 406 the process 400 then throttles down the selected analytic by a second scaling factor that is smaller than the first scaling factor. For example, if step 405 involves filtering out 50% of all positive detections by the selected analytic, then step 406 may involve filtering out 25% of all positive detections by the selected analytic, at least until the next time process 300 is executed on the selected analytic.

Referring back to step 401, if the process 400 determines in step 401 that the selected analytic is not overfiring, then the process 400 proceeds to step 407, in which it determines whether the number of positive detections by the selected analytic for the selected time interval is below a specified underfiring threshold. "Underfiring" in this context means that the selected analytic is not producing at least an expected minimum number of positive detections for a specified time interval, which may suggest that the analytic is ineffective for its intended purpose. If the outcome of step 407 is yes, then process 400 proceeds to step 403, in which the selected analytic is disabled (as in the grossly overfiring case). If the outcome of step 407 is no, then no corrective action is needed, and the evaluated results of the selected analytic are passed through to the risk scoring module 207 at step 408.

FIG. 5 shows another example of an overall process for managing outcomes of cybersecurity analytics so as to reduce false positives and noise. The process 500 may be performed by a cloud-based cybersecurity application, such as cybersecurity application 110 in FIG. 1. The process 500 begins at step 501 by accessing data representing a plurality of events. The plurality of events include machine data generated by a plurality of entities that are part of or that interact with a computer network. In step 502, the process 500 applies a cybersecurity analytic of a cybersecurity application to the data to produce a plurality of analytic results. In step 503 the process 500 evaluates a performance of the cybersecurity analytic by applying the plurality of analytic results to a specified performance criterion. Next, at step 504 the process determines a corrective action for the cybersecurity analytic, based on a result of the evaluation of the performance of the cybersecurity analytic. At step 505 the process incorporates zero or more anomaly or threat detections by the cybersecurity analytic into an output of the cybersecurity application, based on the determined corrective action, wherein the output is to be sent to an external user computer system. At step 506 the process 500 provides the output of the cybersecurity application to the external user computer system.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 6:
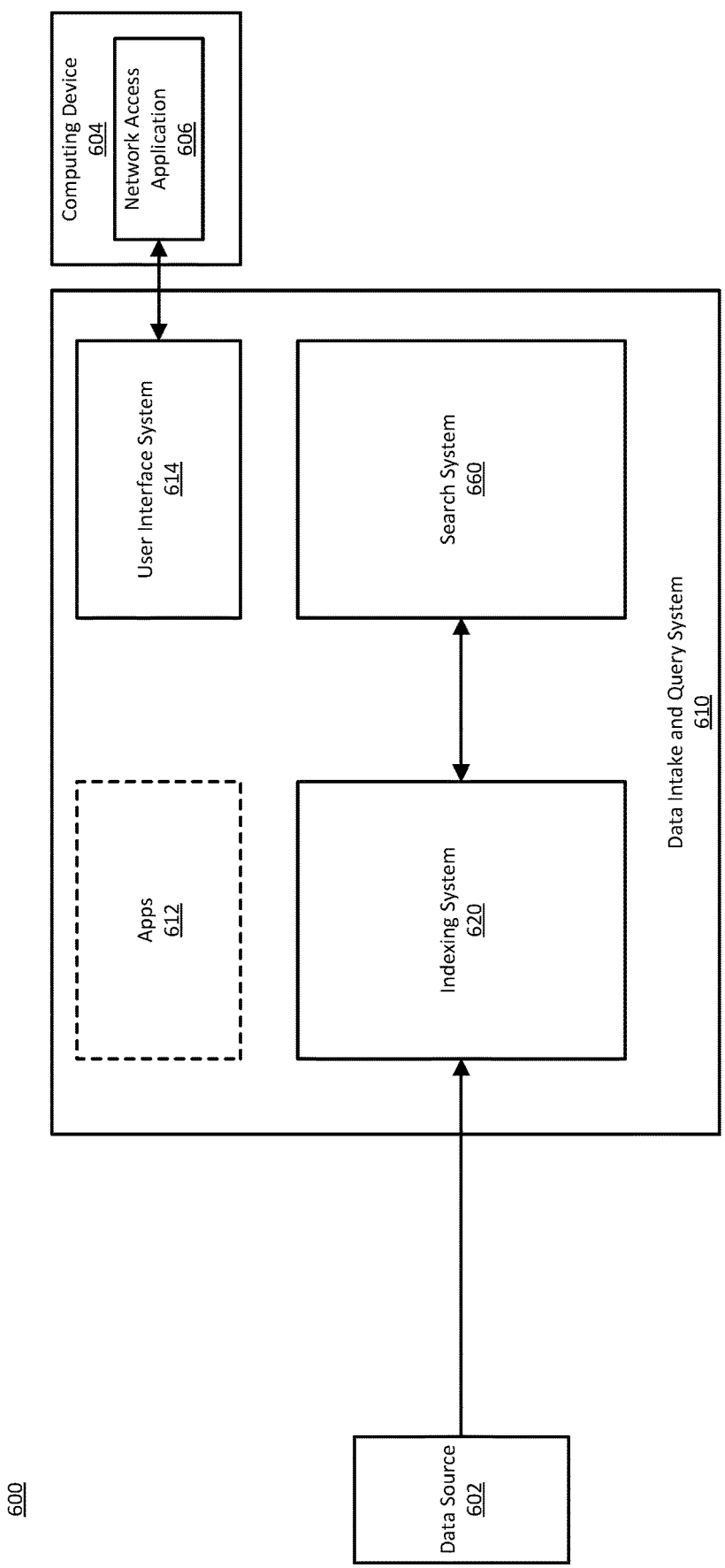
FIG. 6 is a block diagram illustrating an example computing environment that includes a data intake and query system.

FIG. 6 is a block diagram illustrating an example computing environment 600 that includes a data intake and query system (DIQS) 610. The data intake and query system 610 obtains data from a data source 602 in the computing environment 600, and ingests the data using an indexing system 620. A search system 660 of the data intake and query system 610 enables users to navigate the indexed data. Though drawn with separate boxes in FIG. 6, in some implementations the indexing system 620 and the search system 660 can have overlapping components. A computing device 604, running a network access application 606, can communicate with the data intake and query system 610 through a user interface system 614 of the data intake and query system 610. Using the computing device 604, a user can perform various operations with respect to the data intake and query system 610, such as administration of the data intake and query system 610, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 610 can further optionally include apps 612 that extend the search, analytics, and/or visualization capabilities of the data intake and query system 610.

The data intake and query system 610 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 610 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 610 can be executed on a single computing device, or execution of the program code can be distributed over multiple computing devices. For example, the program code can include instructions for both indexing and search components (which may be part of the indexing system 620 and/or the search system 660, respectively), which can be executed on a computing device that also provides the data source 602. As another example, the program code can be executed on one computing device, where execution of the program code provides both indexing and search components, while another copy of the program code executes on a second computing device that provides the data source 602. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 602 of the computing environment 600 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 602 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 620 obtains machine date from the data source 602 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 620 does not require prior knowledge of the structure of incoming data (e.g., the indexing system 620 does not need to be provided with a schema describing the data). Additionally, the indexing system 620 retains a copy of the data as it was received by the indexing system 620 such that the original data is always available for searching (e.g., no data is discarded, though, in some examples, the indexing system 620 can be configured to do so).

The search system 660 searches the data stored by the indexing system 620. As discussed in greater detail below, the search system 660 enables users associated with the computing environment 600 (and possibly also other users) to navigate the data, generate reports, and visualize search results in "dashboards" output using a graphical interface. Using the facilities of the search system 660, users can obtain insights about the data, such as retrieving events from an index, calculating metrics, searching for specific conditions within a rolling time window, identifying patterns in the data, and predicting future trends, among other examples. To achieve greater efficiency, the search system 660 can apply map-reduce methods to parallelize searching of large volumes of data. Additionally, because the original data is available, the search system 660 can apply a schema to the data at search time. This allows different structures to be applied to the same data, or for the structure to be modified if or when the content of the data changes. Application of a schema at search time may be referred to herein as a late-binding schema technique.

The user interface system 614 provides mechanisms through which users associated with the computing environment 600 (and possibly others) can interact with the data intake and query system 610. These interactions can include configuration, administration, and management of the indexing system 620, initiation and/or scheduling of queries that are to be processed by the search system 660, receipt or reporting of search results, and/or visualization of search results. The user interface system 614 can include, for example, facilities to provide a command line interface or a web-based interface.

Users can access the user interface system 614 using a computing device 604 that communicates with data intake and query system 610, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 600. For example, a person can log in as a particular user and, using the user's digital information, can access the data intake and query system 610. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 604 can provide a human-machine interface through which a person can have a digital presence in the computing environment 600 in the form of a user. The computing device 604 is an electronic device having one or more processors and a memory capable of storing instructions for execution by the one or more processors. The computing device 604 can further include input/output (I/O) hardware and a network interface. Applications executed by the computing device 604 can include a network access application 606, such as a web browser, which can use a network interface of the client computing device 604 to communicate, over a network, with the user interface system 614 of the data intake and query system #A110. The user interface system 614 can use the network access application 606 to generate user interfaces that enable a user to interact with the data intake and query system #A110. A web browser is one example of a network access application. A shell tool can also be used as a network access application. In some examples, the data intake and query system 610 is an application executing on the computing device 604. In such examples, the network access application 606 can access the user interface system 614 without going over a network.

The data intake and query system 610 can optionally include apps 612. An app of the data intake and query system 610 is a collection of configurations, knowledge objects (a user-defined entity that enriches the data in the data intake and query system 610), views, and dashboards that may provide additional functionality, different techniques for searching the data, and/or additional insights into the data. The data intake and query system 610 can execute multiple applications simultaneously. Example applications include an information technology service intelligence application, which can monitor and analyze the performance and behavior of the computing environment 600, and an enterprise cybersecurity application, which can include content and searches to assist security analysts in diagnosing and acting on anomalous or malicious behavior in the computing environment 600.

Though FIG. 6 illustrates only one data source, in practical implementations, the computing environment 600 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 600, the data intake and query system 610 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 600 can include on-prem and cloud-based computing resources, or only cloud-based resources. For example, an entity may have on-prem computing devices and a private cloud. In this example, the entity operates the data intake and query system 610 and can choose to execute the data intake and query system 610 on an on-prem computing device or in the cloud. In another example, a provider entity operates the data intake and query system 610 in a public cloud and provides the functionality of the data intake and query system 610 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 610. In some implementations, the entity providing the data intake and query system 610 is itself subscribing to the cloud services of a cloud service provider. As an example, a first entity provides computing resources under a public cloud service model, a second entity subscribes to the cloud services of the first provider entity and uses the cloud computing resources to operate the data intake and query system 610, and a third entity can subscribe to the services of the second provider entity in order to use the functionality of the data intake and query system 610. In this example, the data sources are associated with the third entity, users accessing the data intake and query system 610 are associated with the third entity, and the analytics and insights provided by the data intake and query system 610 are for purposes of the third entity's operations.

Figure 7:
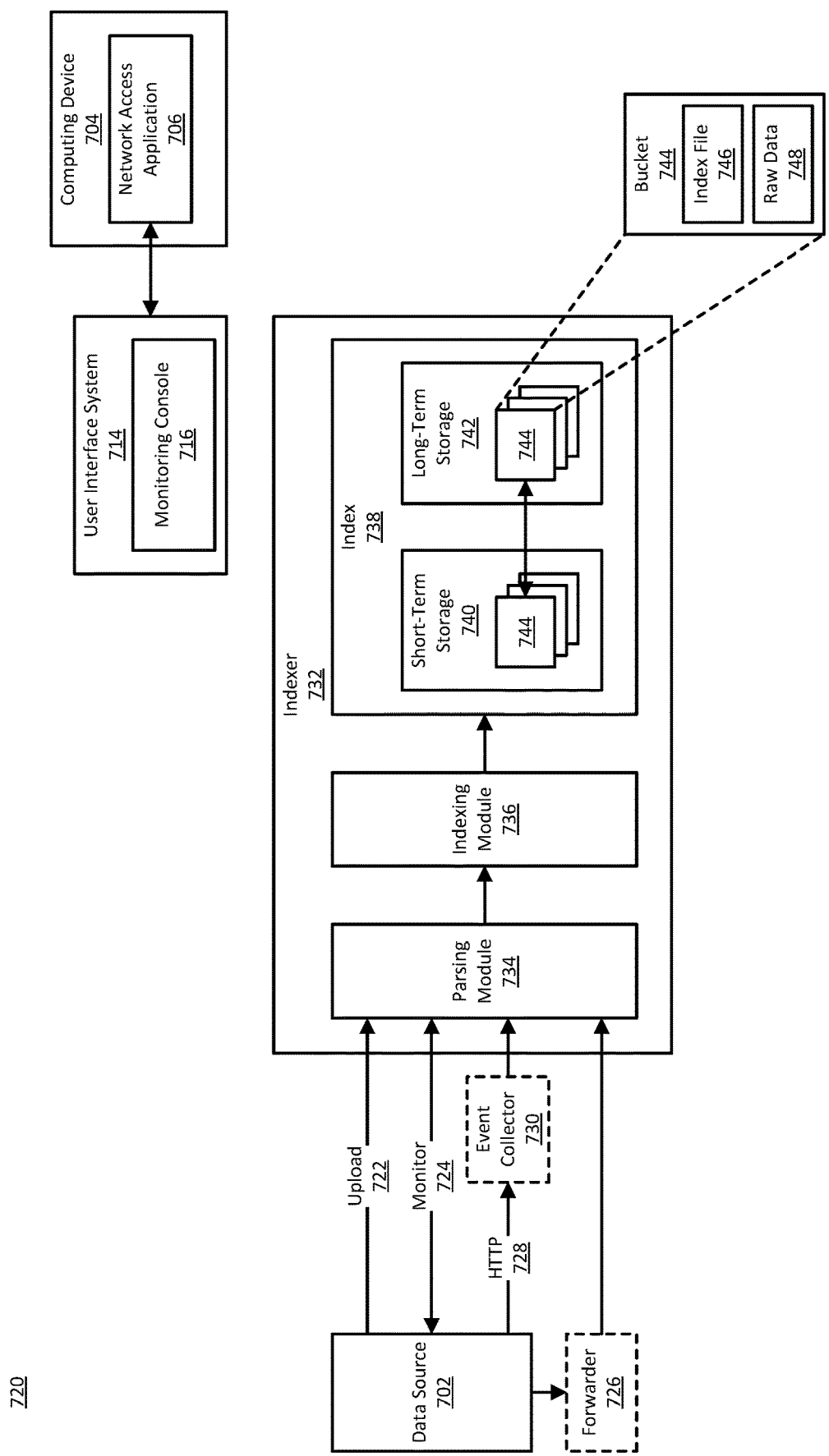
FIG. 7 is a block diagram illustrating an example of the indexing system a data intake and query system of FIG. 6.

FIG. 7 is a block diagram illustrating in greater detail an example of an indexing system 720 of a data intake and query system, such as the data intake and query system 610 of FIG. 6. The indexing system 720 of FIG. 7 uses various methods to obtain machine data from a data source 702 and stores the data in an index 738 of an indexer 732. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 720 enables the data intake and query system to obtain the machine data produced by the data source 702 and to store the data for searching and retrieval.

Users can administer the operations of the indexing system 720 using a computing device 704 that can access the indexing system 720 through a user interface system 714 of the data intake and query system. For example, the computing device 704 can be executing a network access application 706, such as a web browser or a terminal, through which a user can access a monitoring console 716 provided by the user interface system 714. The monitoring console 716 can enable operations such as: identifying the data source 702 for data ingestion; configuring the indexer 732 to index the data from the data source 702; configuring a data ingestion method; configuring, deploying, and managing clusters of indexers; and viewing the topology and performance of a deployment of the data intake and query system, among other operations. The operations performed by the indexing system 720 may be referred to as "index time" operations, which are distinct from "search time" operations that are discussed further below.

The indexer 732, which may be referred to herein as a data indexing component, coordinates and performs most of the index time operations. The indexer 732 can be implemented using program code that can be executed on a computing device. The program code for the indexer 732 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 732. In some implementations, the indexer 732 executes on the computing device 704 through which a user can access the indexing system 720. In some implementations, the indexer 732 executes on a different computing device than the illustrated computing device 704.

The indexer 732 may be executing on the computing device that also provides the data source 702 or may be executing on a different computing device. In implementations wherein the indexer 732 is on the same computing device as the data source 702, the data produced by the data source 702 may be referred to as "local data." In other implementations the data source 702 is a component of a first computing device and the indexer 732 executes on a second computing device that is different from the first computing device. In these implementations, the data produced by the data source 702 may be referred to as "remote data." In some implementations, the first computing device is "on-prem" and in some implementations the first computing device is "in the cloud." In some implementations, the indexer 732 executes on a computing device in the cloud and the operations of the indexer 732 are provided as a service to entities that subscribe to the services provided by the data intake and query system.

For a given data produced by the data source 702, the indexing system 720 can be configured to use one of several methods to ingest the data into the indexer 732. These methods include upload 722, monitor 724, using a forwarder 726, or using HyperText Transfer Protocol (HTTP 728) and an event collector 730. These and other methods for data ingestion may be referred to as "getting data in" (GDI) methods.

Using the upload 722 method, a user can specify a file for uploading into the indexer 732. For example, the monitoring console 716 can include commands or an interface through which the user can specify where the file is located (e.g., on which computing device and/or in which directory of a file system) and the name of the file. The file may be located at the data source 702 or maybe on the computing device where the indexer 732 is executing. Once uploading is initiated, the indexer 732 processes the file, as discussed further below. Uploading is a manual process and occurs when instigated by a user. For automated data ingestion, the other ingestion methods are used.

The monitor 724 method enables the indexing system 720 to monitor the data source 702 and continuously or periodically obtain data produced by the data source 702 for ingestion by the indexer 732. For example, using the monitoring console 716, a user can specify a file or directory for monitoring. In this example, the indexing system 720 can execute a monitoring process that detects whenever the file or directory is modified and causes the file or directory contents to be sent to the indexer 732. As another example, a user can specify a network port for monitoring. In this example, a monitoring process can capture data received at or transmitting from the network port and cause the data to be sent to the indexer 732. In various examples, monitoring can also be configured for data sources such as operating system event logs, performance data generated by an operating system, operating system registries, operating system directory services, and other data sources.

Monitoring is available when the data source 702 is local to the indexer 732 (e.g., the data source 702 is on the computing device where the indexer 732 is executing). Other data ingestion methods, including forwarding and the event collector 730, can be used for either local or remote data sources.

A forwarder 726, which may be referred to herein as a data forwarding component, is a software process that sends data from the data source 702 to the indexer 732. The forwarder 726 can be implemented using program code that can be executed on the computer device that provides the data source 702. A user launches the program code for the forwarder 726 on the computing device that provides the data source 702. The user can further configure the forwarder 726, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 726 can provide various capabilities. For example, the forwarder 726 can send the data unprocessed or can perform minimal processing on the data before sending the data to the indexer 732. Minimal processing can include, for example, adding metadata tags to the data to identify a source, source type, and/or host, among other information, dividing the data into blocks, and/or applying a timestamp to the data. In some implementations, the forwarder 726 can break the data into individual events (event generation is discussed further below) and send the events to a receiver. Other operations that the forwarder 726 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 730 provides an alternate method for obtaining data from the data source 702. The event collector 730 enables data and application events to be sent to the indexer 732 using HTTP 728. The event collector 730 can be implemented using program code that can be executing on a computing device. The program code may be a component of the data intake and query system or can be a standalone component that can be executed independently of the data intake and query system and operates in cooperation with the data intake and query system.

To use the event collector 730, a user can, for example using the monitoring console 716 or a similar interface provided by the user interface system 714, enable the event collector 730 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 702 as an alternative method to using a username and password for authentication.

To send data to the event collector 730, the data source 702 is supplied with a token and can then send HTTP 728 requests to the event collector 730. To send HTTP 728 requests, the data source 702 can be configured to use an HTTP client and/or to use logging libraries such as those supplied by Java, JavaScript, and .NET libraries. An HTTP client enables the data source 702 to send data to the event collector 730 by supplying the data, and a Uniform Resource Identifier (URI) for the event collector 730 to the HTTP client. The HTTP client then handles establishing a connection with the event collector 730, transmitting a request containing the data, closing the connection, and receiving an acknowledgment if the event collector 730 sends one. Logging libraries enable HTTP 728 requests to the event collector 730 to be generated directly by the data source. For example, an application can include or link a logging library, and through functionality provided by the logging library manage establishing a connection with the event collector 730, transmitting a request, and receiving an acknowledgement.

An HTTP 728 request to the event collector 730 can contain a token, a channel identifier, event metadata, and/or event data. The token authenticates the request with the event collector 730. The channel identifier, if available in the indexing system 720, enables the event collector 730 to segregate and keep separate data from different data sources. The event metadata can include one or more key-value pairs that describe the data source 702 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 730 extracts events from HTTP 728 requests and sends the events to the indexer 732. The event collector 730 can further be configured to send events to one or more indexers. Extracting the events can include associating any metadata in a request with the event or events included in the request. In these implementations, event generation by the indexer 732 (discussed further below) is bypassed, and the indexer 732 moves the events directly to indexing. In some implementations, the event collector 730 extracts event data from a request and outputs the event data to the indexer 732, and the indexer generates events from the event data. In some implementations, the event collector 730 sends an acknowledgement message to the data source 702 to indicate that the event collector 730 has received a particular request form the data source 702, and/or to indicate to the data source 702 that events in the request have been added to an index.

The indexer 732 ingests incoming data and transforms the data into searchable knowledge in the form of events. In the data intake and query system, an event is a single piece of data that represents activity of the component represented in FIG. 7 by the data source 702. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 732 can include a parsing module 734 and an indexing module 736 for generating and storing the events. The parsing module 734 and indexing module 736 can be modular and pipelined, such that one component can be operating on a first set of data while the second component is simultaneously operating on a second sent of data. Additionally, the indexer 732 may at any time have multiple instances of the parsing module 734 and indexing module 736, with each set of instances configured to simultaneously operate on data from the same data source or from different data sources. The parsing module 734 and indexing module 736 are illustrated in FIG. 7 to facilitate discussion, with the understanding that implementations with other components are possible to achieve the same functionality.

The parsing module 734 determines information about incoming event data, where the information can be used to identify events within the event data. For example, the parsing module 734 can associate a source type with the event data. A source type identifies the data source 702 and describes a possible data structure of event data produced by the data source 702. For example, the source type can indicate which fields to expect in events generated at the data source 702 and the keys for the values in the fields, and possibly other information such as sizes of fields, an order of the fields, a field separator, and so on. The source type of the data source 702 can be specified when the data source 702 is configured as a source of event data. Alternatively, the parsing module 734 can determine the source type from the event data, for example from an event field in the event data or using machine learning techniques applied to the event data.

Other information that the parsing module 734 can determine includes timestamps. In some cases, an event includes a timestamp as a field, and the timestamp indicates a point in time when the action represented by the event occurred or was recorded by the data source 702 as event data. In these cases, the parsing module 734 may be able to determine from the source type associated with the event data that the timestamps can be extracted from the events themselves. In some cases, an event does not include a timestamp and the parsing module 734 determines a timestamp for the event, for example from a name associated with the event data from the data source 702 (e.g., a file name when the event data is in the form of a file) or a time associated with the event data (e.g., a file modification time). As another example, when the parsing module 734 is not able to determine a timestamp from the event data, the parsing module 734 may use the time at which it is indexing the event data. As another example, the parsing module 734 can use a user-configured rule to determine the timestamps to associate with events.

The parsing module 734 can further determine event boundaries. In some cases, a single line (e.g., a sequence of characters ending with a line termination) in event data represents one event while in other cases, a single line represents multiple events. In yet other cases, one event may span multiple lines within the event data. The parsing module 734 may be able to determine event boundaries from the source type associated with the event data, for example from a data structure indicated by the source type. In some implementations, a user can configure rules the parsing module 734 can use to identify event boundaries.

The parsing module 734 can further extract data from events and possibly also perform transformations on the events. For example, the parsing module 734 can extract a set of fields (key-value pairs) for each event, such as a host or hostname, source or source name, and/or source type. The parsing module 734 may extract certain fields by default or based on a user configuration. Alternatively or additionally, the parsing module 734 may add fields to events, such as a source type or a user-configured field. As another example of a transformation, the parsing module 734 can anonymize fields in events to mask sensitive information, such as social security numbers or account numbers. Anonymizing fields can include changing or replacing values of specific fields. The parsing module 734 can further perform user-configured transformations.

The parsing module 734 outputs the results of processing incoming event data to the indexing module 736, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 732 can be configured to identify searchable segments that are parts of fields, searchable segments that are entire fields, or both. The parsing module 734 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 746, to find event data that matches a search query. In some implementations, segmentation can alternatively be performed by the forwarder 726. Segmentation can also be disabled, in which case the indexer 732 will not build a lexicon for the event data. When segmentation is disabled, the search system searches the event data directly.

Building index data structures generates the index 738. The index 738 is a storage data structure on a storage device (e.g., a disk drive or other physical device for storing digital data). The storage device may be a component of the computing device on which the indexer 732 is operating (referred to herein as local storage) or may be a component of a different computing device (referred to herein as remote storage) that the indexer 738 has access to over a network. The indexer 732 can manage more than one index and can manage indexes of different types. For example, the indexer 732 can manage event indexes, which impose minimal structure on stored data and can accommodate any type of data. As another example, the indexer 732 can manage metrics indexes, which use a highly structured format to handle the higher volume and lower latency demands associated with metrics data.

The indexing module 736 organizes files in the index 738 in directories referred to as buckets. The files in a bucket 744 can include raw data files, index files, and possibly also other metadata files. As used herein, "raw data" means data as when the data was produced by the data source 702, without alteration to the format or content. As noted previously, the parsing module 734 may add fields to event data and/or perform transformations on fields in the event data. Event data that has been altered in this way is referred to herein as enriched data. A raw data file 748 can include enriched data, in addition to or instead of raw data. The raw data file 748 may be compressed to reduce disk usage. An index file 746, which may also be referred to herein as a "time-series index" or tsidx file, contains metadata that the indexer 732 can use to search a corresponding raw data file 748. As noted above, the metadata in the index file 746 includes a lexicon of the event data, which associates each unique keyword in the event data with a reference to the location of event data within the raw data file 748. The keyword data in the index file 746 may also be referred to as an inverted index. In various implementations, the data intake and query system can use index files for other purposes, such as to store data summarizations that can be used to accelerate searches.

A bucket 744 includes event data for a particular range of time. The indexing module 736 arranges buckets in the index 738 according to the age of the buckets, such that buckets for more recent ranges of time are stored in short-term storage 740 and buckets for less recent ranges of time are stored in long-term storage 742. Short-term storage 740 may be faster to access while long-term storage 742 may be slower to access. Buckets may be moves from short-term storage 740 to long-term storage 742 according to a configurable data retention policy, which can indicate at what point in time a bucket is old enough to be moved.

A bucket's location in short-term storage 740 or long-term storage 742 can also be indicated by the bucket's status. As an example, a bucket's status can be "hot," "warm," "cold," "frozen," or "thawed." In this example, hot bucket is one to which the indexer 732 is writing data and the bucket becomes a warm bucket when the index 732 stops writing data to it. In this example, both hot and warm buckets reside in short-term storage 740. Continuing this example, when a warm bucket is moved to long-term storage 742, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 720 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 720 through the monitoring console 716 provided by the user interface system 714. Using the monitoring console 716, the user can configure and monitor an index cluster, and see information such as disk usage by an index, volume usage by an indexer, index and volume size over time, data age, statistics for bucket types, and bucket settings, among other information.

Figure 8:
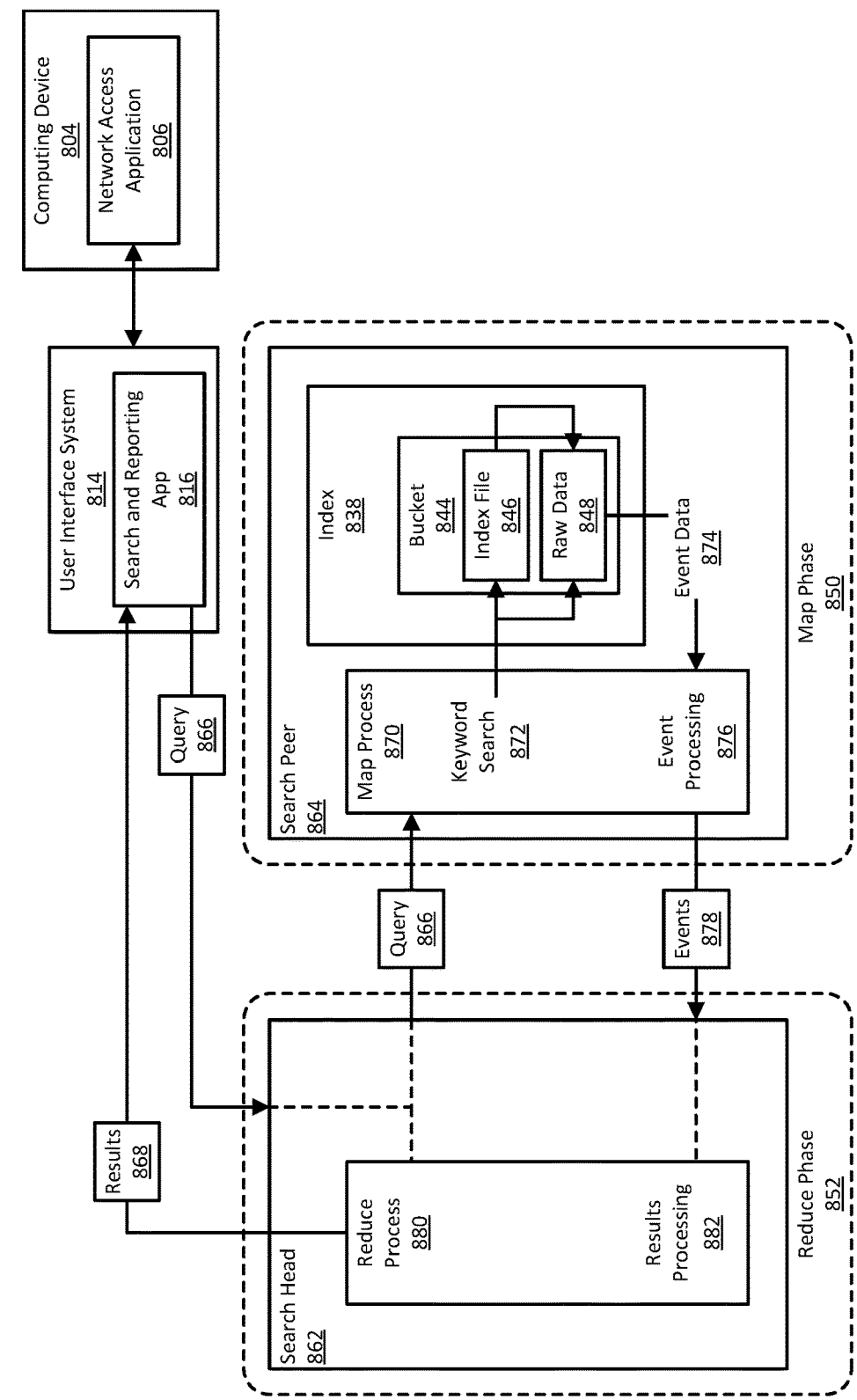
FIG. 8 is a block diagram illustrating an example of a search system of the data intake and query system of FIG. 7.

FIG. 8 is a block diagram illustrating in greater detail an example of the search system 860 of a data intake and query system, such as the data intake and query system 610 of FIG. 6. The search system 860 of FIG. 8 issues a query 866 to a search head 862, which sends the query 866 to a search peer 864. Using a map process 870, the search peer 864 searches the appropriate index 838 for events identified by the query 866 and sends events 878 so identified back to the search head 862. Using a reduce process 882, the search head 862 processes the events 878 and produces results 868 to respond to the query 866. The results 868 can provide useful insights about the data stored in the index 838. These insights can aid in the administration of information technology systems, in security analysis of information technology systems, and/or in analysis of the development environment provided by information technology systems.

The query 866 that initiates a search is produced by a search and reporting app 816 that is available through the user interface system 814 of the data intake and query system. Using a network access application 806 executing on a computing device 804, a user can input the query 866 into a search field provided by the search and reporting app 816. Alternatively or additionally, the search and reporting app 816 can include pre-configured queries or stored queries that can be activated by the user. In some cases, the search and reporting app 816 initiates the query 866 when the user enters the query 866. In these cases, the query 866 maybe referred to as an "ad-hoc" query. In some cases, the search and reporting app 816 initiates the query 866 based on a schedule. For example, the search and reporting app 816 can be configured to execute the query 866 once per hour, once per day, at a specific time, on a specific date, or at some other time that can be specified by a date, time, and/or frequency. These types of queries maybe referred to as scheduled queries.

The query 866 is specified using a search processing language. The search processing language includes commands or search terms that the search peer 864 will use to identify events to return in the search results 868. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 866 to include sequential commands, where a subsequent command may operate on the results of a prior command. As an example, sequential commands may be separated in the query 866 by a vertical line ("|" or "pipe") symbol.

In addition to one or more search commands, the query 866 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 866 occurs in two broad phases: a map phase 850 and a reduce phase 852. The map phase 850 takes place across one or more search peers. In the map phase 850, the search peers locate event data that matches the search terms in the search query 866 and sorts the event data into field-value pairs. When the map phase 850 is complete, the search peers send events that they have found to one or more search heads for the reduce phase 852. During the reduce phase 852, the search heads process the events through commands in the search query 866 and aggregate the events to produce the final search results 868.

A search head, such as the search head 862 illustrated in FIG. 8, is a component of the search system 860 that manages searches. The search head 862, which may also be referred to herein as a search management component, can be implemented using program code that can be executed on a computing device. The program code for the search head 862 can be stored on a non-transitory computer-readable medium and from this medium can be loaded or copied to the memory of a computing device. One or more hardware processors of the computing device can read the program code from the memory and execute the program code in order to implement the operations of the search head 862.

Upon receiving the search query 866, the search head 862 directs the query 866 to one or more search peers, such as the search peer 864 illustrated in FIG. 8. "Search peer" is an alternate name for "indexer" and a search peer may be largely similar to the indexer described previously. The search peer 864 may be referred to as a "peer node" when the search peer 864 is part of an indexer cluster. The search peer 864, which may also be referred to as a search execution component, can be implemented using program code that can be executed on a computing device. In some implementations, one set of program code implements both the search head 862 and the search peer 864 such that the search head 862 and the search peer 864 form one component. In some implementations, the search head 862 is an independent piece of code that performs searching and no indexing functionality. In these implementations, the search head 862 may be referred to as a dedicated search head.

The search head 862 may consider multiple criteria when determining whether to send the query 866 to the particular search peer 864. For example, the search system 860 may be configured to include multiple search peers that each have duplicative copies of at least some of the event data and are implanted using different hardware resources q. In this example, the sending the search query 866 to more than one search peer allows the search system 860 to distribute the search workload across different hardware resources. As another example, search system 860 may include different search peers for different purposes (e.g., one has an index storing a first type of data or from a first data source while a second has an index storing a second type of data or from a second data source). In this example, the search query 866 may specify which indexes to search, and the search head 862 will send the query 866 to the search peers that have those indexes.

To identify events 878 to send back to the search head 862, the search peer 864 performs a map process 870 to obtain event data 874 from the index 838 that is maintained by the search peer 864. During a first phase of the map process 870, the search peer 864 identifies buckets that have events that are described by the time indicator in the search query 866. As noted above, a bucket contains events whose timestamps fall within a particular range of time. For each bucket 844 whose events can be described by the time indicator, during a second phase of the map process 870, the search peer 864 performs a keyword search 872 using search terms specified in the search query 866. The search terms can be one or more of keywords, phrases, fields, Boolean expressions, and/or comparison expressions that in combination describe events being searched for. When segmentation is enabled at index time, the search peer 864 performs the keyword search 872 on the bucket's index file 846. As noted previously, the index file 846 includes a lexicon of the searchable terms in the events stored in the bucket's raw data 848 file. The keyword search 872 searches the lexicon for searchable terms that correspond to one or more of the search terms in the query 866. As also noted above, the lexicon incudes, for each searchable term, a reference to each location in the raw data 848 file where the searchable term can be found. Thus, when the keyword search identifies a searchable term in the index file 846 that matches a search term in the query 866, the search peer 864 can use the location references to extract from the raw data 848 file the event data 874 for each event that include the searchable term.

In cases where segmentation was disabled at index time, the search peer 864 performs the keyword search 872 directly on the raw data 848 file. To search the raw data 848, the search peer 864 may identify searchable segments in events in a similar manner as when the data was indexed. Thus, depending on how the search peer 864 is configured, the search peer 864 may look at event fields and/or parts of event fields to determine whether an event matches the query 866. Any matching events can be added to the event data 874 read from the raw data 848 file. The search peer 864 can further be configured to enable segmentation at search time, so that searching of the index 838 causes the search peer 864 to build a lexicon in the index file 846.

The event data 874 obtained from the raw data 848 file includes the full text of each event found by the keyword search 872. During a third phase of the map process 870, the search peer 864 performs event processing 876 on the event data 874, with the steps performed being determined by the configuration of the search peer 864 and/or commands in the search query 866. For example, the search peer 864 can be configured to perform field discovery and field extraction. Field discovery is a process by which the search peer 864 identifies and extracts key-value pairs from the events in the event data 874. The search peer 864 can, for example, be configured to automatically extract the first 100 fields (or another number of fields) in the event data 874 that can be identified as key-value pairs. As another example, the search peer 864 can extract any fields explicitly mentioned in the search query 866. The search peer 864 can, alternatively or additionally, be configured with particular field extractions to perform.

Other examples of steps that can be performed during event processing 876 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 864 sends processed events 878 to the search head 862, which performs a reduce process 880. The reduce process 880 potentially receives events from multiple search peers and performs various results processing 882 steps on the received events. The results processing 882 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 882 can further include applying commands from the search query 866 to the events. The query 866 can include, for example, commands for evaluating and/or manipulating fields (e.g., to generate new fields from existing fields or parse fields that have more than one value). As another example, the query 866 can include commands for calculating statistics over the events, such as counts of the occurrences of fields, or sums, averages, ranges, and so on, of field values. As another example, the query 866 can include commands for generating statistical values for purposes of generating charts of graphs of the events.

The reduce process 880 outputs the events found by the search query 866, as well as information about the events. The search head 862 transmits the events and the information about the events as search results 868, which are received by the search and reporting app 816. The search and reporting app 816 can generate visual interfaces for viewing the search results 868. The search and reporting app 816 can, for example, output visual interfaces for the network access application 806 running on a computing device 804 to generate.

The visual interfaces can include various visualizations of the search results 868, such as tables, line or area charts, Chloropleth maps, or single values. The search and reporting app 816 can organize the visualizations into a dashboard, where the dashboard includes a panel for each visualization. A dashboard can thus include, for example, a panel listing the raw event data for the events in the search results 868, a panel listing fields extracted at index time and/or found through field discovery along with statistics for those fields, and/or a timeline chart indicating how many events occurred at specific points in time (as indicated by the timestamps associated with each event). In various implementations, the search and reporting app 816 can provide one or more default dashboards. Alternatively or additionally, the search and reporting app 816 can include functionality that enables a user to configure custom dashboards.

The search and reporting app 816 can also enable further investigation into the events in the search results 868. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 866. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 9:
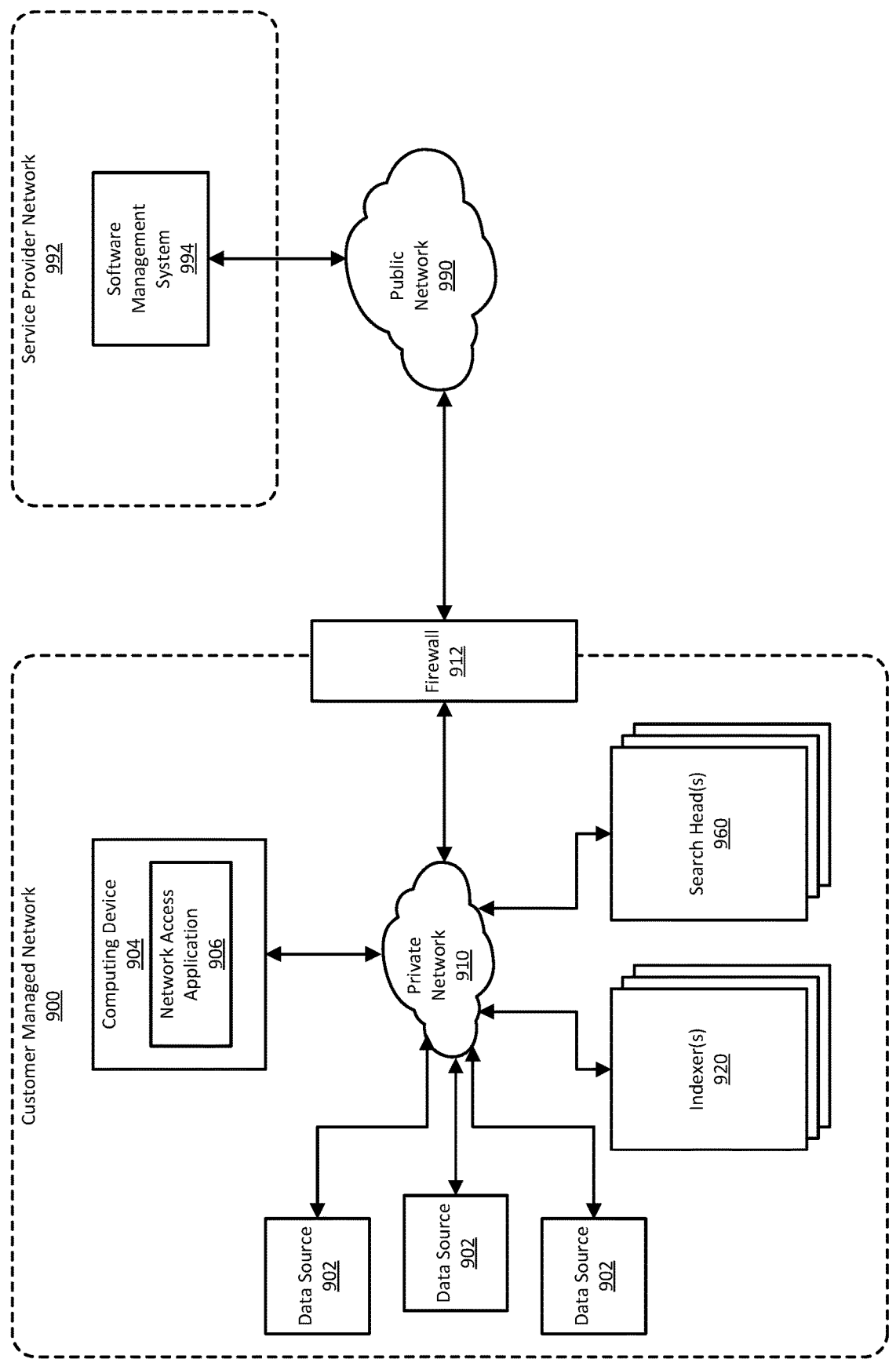
FIG. 9 illustrates an example of a self-managed network that includes a data intake and query system.

FIG. 9 illustrates an example of a self-managed network 900 that includes a data intake and query system. "Self-managed" in this instance means that the entity that is operating the self-managed network 900 configures, administers, maintains, and/or operates the data intake and query system using its own compute resources and people. Further, the self-managed network 900 of this example is part of the entity's on-premise network and comprises a set of compute, memory, and networking resources that are located, for example, within the confines of an entity's data center. These resources can include software and hardware resources. The entity can, for example, be a company or enterprise, a school, government entity, or other entity. Since the self-managed network 900 is located within the customer's on-prem environment, such as in the entity's data center, the operation and management of the self-managed network 900, including of the resources in the self-managed network 900, is under the control of the entity. For example, administrative personnel of the entity have complete access to and control over the configuration, management, and security of the self-managed network 900 and its resources.

The self-managed network 900 can execute one or more instances of the data intake and query system. An instance of the data intake and query system may be executed by one or more computing devices that are part of the self-managed network 900. A data intake and query system instance can comprise an indexing system and a search system, where the indexing system includes one or more indexers 920 and the search system includes one or more search heads 960.

As depicted in FIG. 9, the self-managed network 900 can include one or more data sources 902. Data received from these data sources may be processed by an instance of the data intake and query system within self-managed network 900. The data sources 902 and the data intake and query system instance can be communicatively coupled to each other via a private network 910.

Users associated with the entity can interact with and avail themselves of the functions performed by a data intake and query system instance using computing devices. As depicted in FIG. 9, a computing device 904 can execute a network access application 906 (e.g., a web browser), that can communicate with the data intake and query system instance and with data sources 902 via the private network 910. Using the computing device 904, a user can perform various operations with respect to the data intake and query system, such as management and administration of the data intake and query system, generation of knowledge objects, and other functions. Results generated from processing performed by the data intake and query system instance may be communicated to the computing device 904 and output to the user via an output system (e.g., a screen) of the computing device 904.

The self-managed network 900 can also be connected to other networks that are outside the entity's on-premises environment/network, such as networks outside the entity's data center. Connectivity to these other external networks is controlled and regulated through one or more layers of security provided by the self-managed network 900. One or more of these security layers can be implemented using firewalls 912. The firewalls 912 form a layer of security around the self-managed network 900 and regulate the transmission of traffic from the self-managed network 900 to the other networks and from these other networks to the self-managed network 900.

Networks external to the self-managed network can include various types of networks including public networks 990, other private networks, and/or cloud networks provided by one or more cloud service providers. An example of a public network 990 is the Internet. In the example depicted in FIG. 9, the self-managed network 900 is connected to a service provider network 992 provided by a cloud service provider via the public network 990.

In some implementations, resources provided by a cloud service provider may be used to facilitate the configuration and management of resources within the self-managed network 900. For example, configuration and management of a data intake and query system instance in the self-managed network 900 may be facilitated by a software management system 994 operating in the service provider network 992. There are various ways in which the software management system 994 can facilitate the configuration and management of a data intake and query system instance within the self-managed network 900. As one example, the software management system 994 may facilitate the download of software including software updates for the data intake and query system. In this example, the software management system 994 may store information indicative of the versions of the various data intake and query system instances present in the self-managed network 900. When a software patch or upgrade is available for an instance, the software management system 994 may inform the self-managed network 900 of the patch or upgrade. This can be done via messages communicated from the software management system 994 to the self-managed network 900.

The software management system 994 may also provide simplified ways for the patches and/or upgrades to be downloaded and applied to the self-managed network 900. For example, a message communicated from the software management system 994 to the self-managed network 900 regarding a software upgrade may include a Uniform Resource Identifier (URI) that can be used by a system administrator of the self-managed network 900 to download the upgrade to the self-managed network 900. In this manner, management resources provided by a cloud service provider using the service provider network 992 and which are located outside the self-managed network 900 can be used to facilitate the configuration and management of one or more resources within the entity's on-prem environment. In some implementations, the download of the upgrades and patches may be automated, whereby the software management system 994 is authorized to, upon determining that a patch is applicable to a data intake and query system instance inside the self-managed network 900, automatically communicate the upgrade or patch to self-managed network 900 and cause it to be installed within self-managed network 900.

Figure 10:
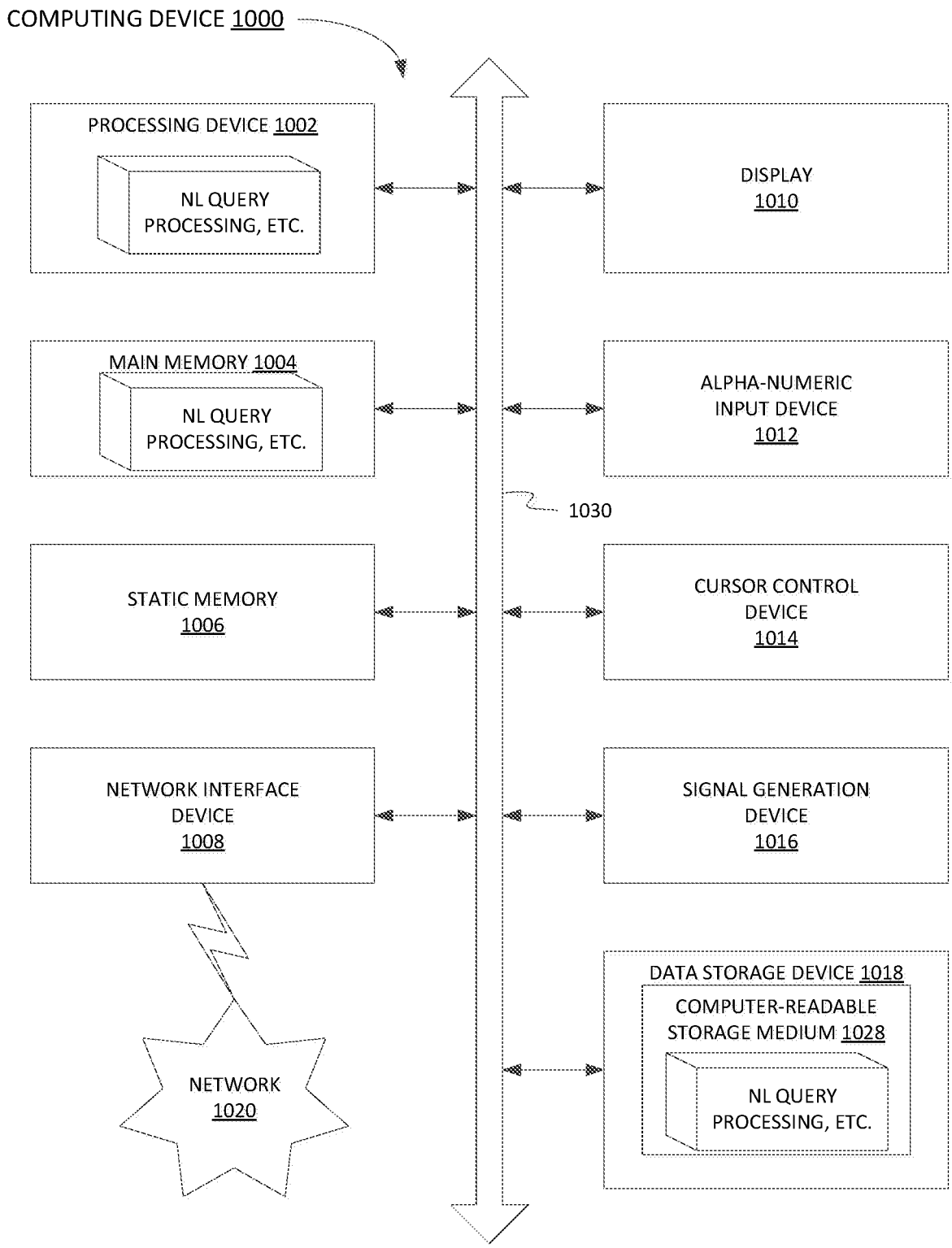
FIG. 10 is a block diagram of a computer system that can implemented some or all of the techniques introduced herein.

FIG. 10 illustrates a diagrammatic representation of a computing device within which a set of instructions for causing the computing device to perform the methods discussed herein may be executed. The computing device 1000 may be connected to other computing devices in a LAN, an intranet, an extranet, and/or the Internet. The computing device 1000 may operate in the capacity of a server machine in client-server network environment. The computing device 1000 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein. In illustrative examples, the computing device 1000 may implement the above described methods for NL query processing.

The exemplary computing device 1000 may include a processing device (e.g., a general-purpose processor) 1002, a main memory 1004 (e.g., synchronous dynamic random-access memory (DRAM), read-only memory (ROM)), a static memory 1006 (e.g., flash memory and a data storage device 1018), which may communicate with each other via a bus 1030.

The processing device 1002 may be provided by one or more general-purpose processing devices such as a microprocessor, central processing unit, or the like. In an illustrative example, the processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices, such as an application specific integrated circuit (ASIC), a field programmable gate array (FPGA), a digital signal processor (DSP), a network processor, or the like. The processing device 1002 may be configured to execute the methods described herein, in accordance with one or more aspects of the present disclosure.

The computing device 1000 may further include a network interface device 1008, which may communicate with a network 1020. The computing device 1000 also may include a display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, display unit 1010, alphanumeric input device 1012, and cursor control device 1014 may be combined into a single component or device (e.g., an LCD touch screen).

The data storage device 1018 may include a computer-readable storage medium 1028 on which may be stored one or more sets of instructions (e.g., instructions of the methods described herein, in accordance with one or more aspects of the present disclosure) implementing any one or more of the methods or functions described herein. Instructions implementing methods may also reside, completely or at least partially, within main memory 1004 and/or within processing device 1002 during execution thereof by computing device 1000, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method comprising:
    accessing, by a first computer system, data representing a plurality of events, the plurality of events including machine data generated by a plurality of entities that are part of or that interact with a computer network;
    applying, by the first computer system, a cybersecurity analytic of a cybersecurity application to the data to produce a plurality of analytic results, wherein the cybersecurity analytic is to detect a cybersecurity-related anomaly or threat;

evaluating, by the first computer system, a performance of the cybersecurity analytic by at least determining whether a number of anomaly or threat detections produced by the cybersecurity analytic for a specified time interval exceeds a first threshold or falls below a second threshold different from the first threshold;

determining, by the first computer system, a corrective action for the cybersecurity analytic, based on a result of the evaluating the performance of the cybersecurity analytic;

incorporating, by the first computer system, zero or more anomaly or threat detections by the cybersecurity analytic into an output of the cybersecurity application, based on the determined corrective action, wherein the output is to be sent to an external user computer system; and providing the output of the cybersecurity application to the external user computer system.

2. The method as recited in claim 1, wherein the corrective action comprises throttling operability of the cybersecurity analytic by a prescribed factor to prevent some of the anomaly or threat detections produced by the cybersecurity analytic from being included in the output of the cybersecurity application when the number of anomaly or threat detections exceeds the second threshold and falls below the first threshold.

3. The method as recited in claim 1, wherein the corrective action comprises preventing a specified percentage or portion of all anomaly or threat detections produced by the cybersecurity analytic for a particular time interval from being included in the output of the cybersecurity application when the number of anomaly or threat detections exceeds the second threshold and falls below the first threshold.

4. The method as recited in claim 1, wherein the corrective action comprises disabling the cybersecurity analytic when the number of anomaly or threat detections exceeds the first threshold.

5. The method as recited in claim 1, wherein the corrective action comprises throttling operability of the cybersecurity analytic by (i) a first prescribed factor to reduce the number of anomaly or threat detections produced by the cybersecurity analytic from being included in the output of the cybersecurity application when the number of anomaly or threat detections exceeds a third threshold greater than the second threshold and less than the first threshold and (ii) a second prescribed factor less than the first prescribed factor to reduce, by a lesser amount, the number of anomaly or threat detections produced by the cybersecurity analytic when the number of anomaly or threat detections falls below the third threshold and is greater than the second threshold.

6. The method as recited in claim 1, wherein the evaluating comprises applying the number of anomaly or threat detections output by the cybersecurity analytic for a specified time interval to a range of thresholds including the first threshold to denote a number of anomaly or threat detections beyond a normal or expected range that could make the cybersecurity analytics unreliable and the second threshold to denote a number of anomaly or threat detections below the normal or expected range in which the cybersecurity analytics is ineffective.

7. The method as recited in claim 1, wherein the evaluating comprises:

applying the number of anomaly or threat detections output by the cybersecurity analytic for a specified time interval to the first threshold; and determining that the cybersecurity analytic is overfiring if the number of anomaly or threat detections output by the cybersecurity analytic for the specified time interval is above the first threshold.

8. The method as recited in claim 1, wherein the evaluating comprises:

applying a number of anomaly or threat detections output by the cybersecurity analytic for a specified time interval to the second threshold; and determining that the cybersecurity analytic is underperforming if the number of anomaly or threat detections output by the cybersecurity analytic for the specified time interval is below the second threshold.

9. The method as recited in claim 1, wherein the evaluating comprises:

applying the number of anomaly or threat detections output by the cybersecurity analytic for a specified time interval to the first threshold and the second threshold; and determining that the cybersecurity analytic is overfiring if the number of anomaly or threat detections output by the cybersecurity analytic for the specified time interval is above the first threshold, or that the cybersecurity analytic is underperforming if the number of anomaly or threat detections output by the cybersecurity analytic for the specified time interval is below the second threshold.

10. The method as recited in claim 1, wherein the data representing the plurality of events are received by the first computer system from the external user computer system prior to the accessing of the data representing the plurality of events, and wherein the first computer system is a cloud-based computer system and the user computer system is an on-premises computer system.

11. The method as recited in claim 1, wherein the evaluating comprises applying a random sampling of analytic results produced by the cybersecurity analytic to the first threshold and the second threshold.

12. The method as recited in claim 1, wherein the evaluating is performed by a machine learning runtime.

13. The method as recited in claim 1, further comprising: executing the applying, the evaluating, the determining and the incorporating, for each of a plurality of cybersecurity analytics, including determining a separate corrective action for each of the plurality of cybersecurity analytics, wherein each of the plurality of cybersecurity analytics is to detect a different type of cybersecurity-related anomaly or threat.

14. A computer system comprising:

a processor; and a non-transitory computer-readable medium having stored thereon instructions, execution of which by the processor causes the computer system to perform operations including:

accessing data representing a plurality of events, the plurality of events including machine data generated by a plurality of entities that are part of or that interact with a computer network;

applying a cybersecurity analytic of a cybersecurity application to the data to produce a plurality of analytic results, wherein the cybersecurity analytic is to detect a cybersecurity-related anomaly or threat;

evaluating a performance of the cybersecurity analytic by at least determining whether a number of anomaly or threat detections produced by the cybersecurity analytic for a specified time interval exceeds a first threshold or falls below a second threshold different from the first threshold;

determining a corrective action for the cybersecurity analytic, based on a result of the evaluating the performance of the cybersecurity analytic;

incorporating zero or more anomaly or threat detections by the cybersecurity analytic into an output of the cybersecurity application, based on the determined corrective action, wherein the output is to be sent to an external user computer system; and providing the output of the cybersecurity application to the external user computer system.

15. The computer system as recited in claim 14, wherein the corrective action comprises throttling operability of the cybersecurity analytic by a prescribed factor to prevent some of the anomaly or threat detections produced by the cybersecurity analytic from being included in the output of the cybersecurity application when the number of anomaly or threat detections exceeds the second threshold and falls below the first threshold.

16. The computer system as recited in claim 14, wherein the corrective action comprises disabling the cybersecurity analytic when the number of anomaly or threat detections exceeds the first threshold.

17. The computer system as recited in claim 14, wherein the corrective action comprises throttling operability of the cybersecurity analytic by (i) a first prescribed factor to reduce the number of anomaly or threat detections produced by the cybersecurity analytic from being included in the output of the cybersecurity application when the number of anomaly or threat detections exceeds a third threshold greater than the second threshold and less than the first threshold and (ii) a second prescribed factor less than the first prescribed factor to reduce, by a lesser amount, the number of anomaly or threat detections produced by the cybersecurity analytic when the number of anomaly or threat detections falls below the third threshold and is greater than the second threshold.

18. A non-transitory computer-readable medium having stored therein instructions, execution of which by one or more processors causes the one or more processors to perform operations including:

accessing data representing a plurality of events, the plurality of events including machine data generated by a plurality of entities that are part of or that interact with a computer network;

applying a cybersecurity analytic of a cybersecurity application to the data to produce a plurality of analytic results, wherein the cybersecurity analytic is to detect a cybersecurity-related anomaly or threat;

evaluating a performance of the cybersecurity analytic by at least determining whether a number of anomaly or threat detections produced by the cybersecurity analytic for a specified time interval exceeds a first threshold or falls below a second threshold different from the first threshold;

determining a corrective action for the cybersecurity analytic, based on a result of the evaluating the performance of the cybersecurity analytic;

incorporating zero or more anomaly or threat detections by the cybersecurity analytic into an output of the cybersecurity application, based on the determined corrective action, wherein the output is to be sent to an external user computer system; and providing the output of the cybersecurity application to the external user computer system.

19. The non-transitory computer-readable medium as recited in claim 18, wherein the corrective action comprises at least one of:

preventing some anomaly or threat detections produced by the cybersecurity analytic from being included in the output of the cybersecurity application when the number of anomaly or threat detections exceeds the second threshold and falls below the first threshold; or disabling the cybersecurity analytic when the number of anomaly or threat detections exceeds the first threshold.

20. The non-transitory computer-readable medium as recited in claim 19, wherein the evaluating comprises applying the number of anomaly or threat detections output by the cybersecurity analytic for the specified time interval to the second threshold and determining that the cybersecurity analytic is underperforming if the number of anomaly or threat detections output by the cybersecurity falls below the second threshold.

* * * * *